C. A. BORCHERT AND M. G. O'NEIL.
VALVE.
APPLICATION FILED SEPT. 17, 1920.
1,387,831.
Patented Aug. 16, 1921.
2 SHEETS—SHEET 1.
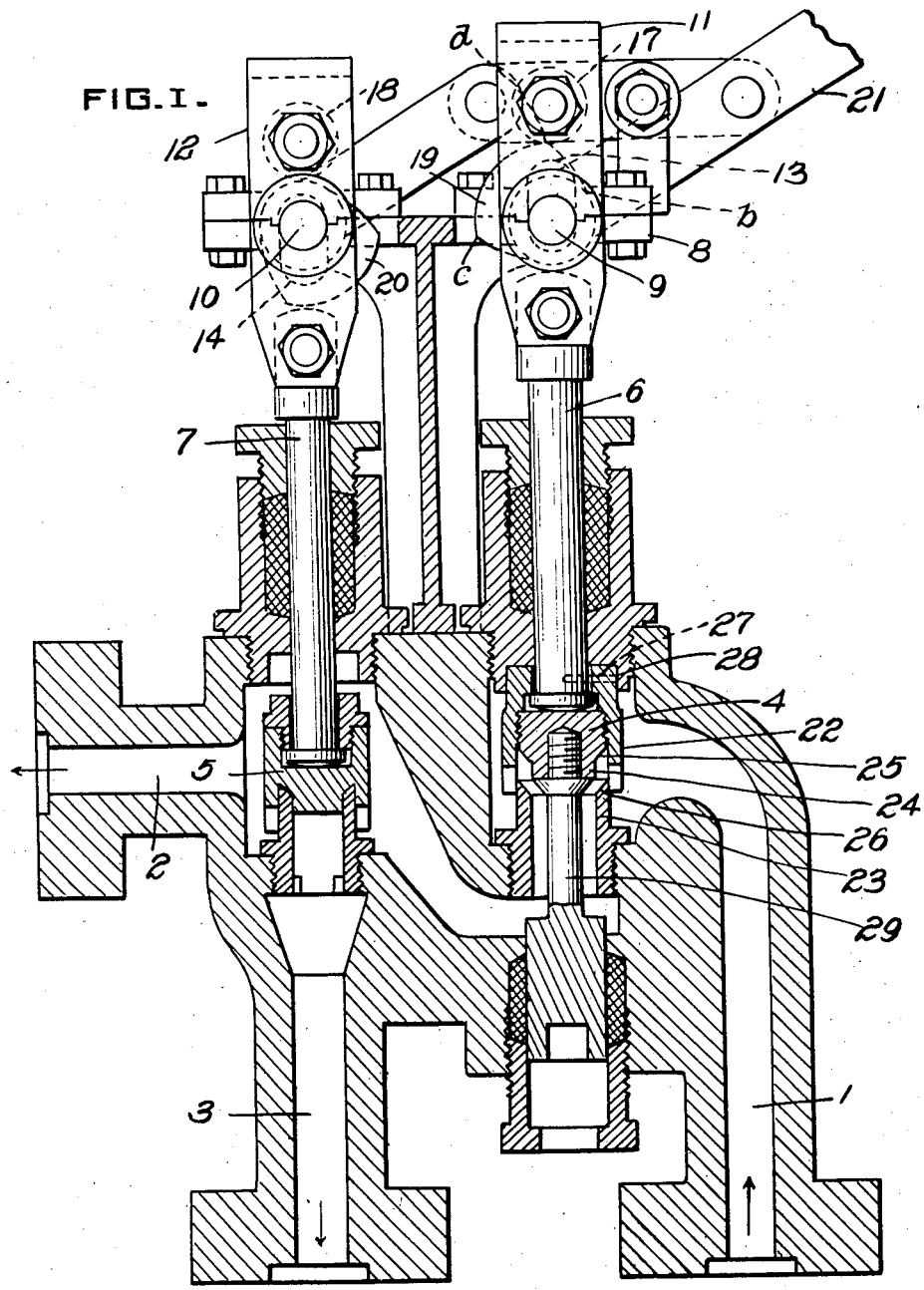
FIG.I.
WITNESSES
J. Herbert Bradley
Francis J. Tomasson
INVENTORS
Charles A. Borchert
Michael G. O'Neil
by Christy and Christy
their attorneys

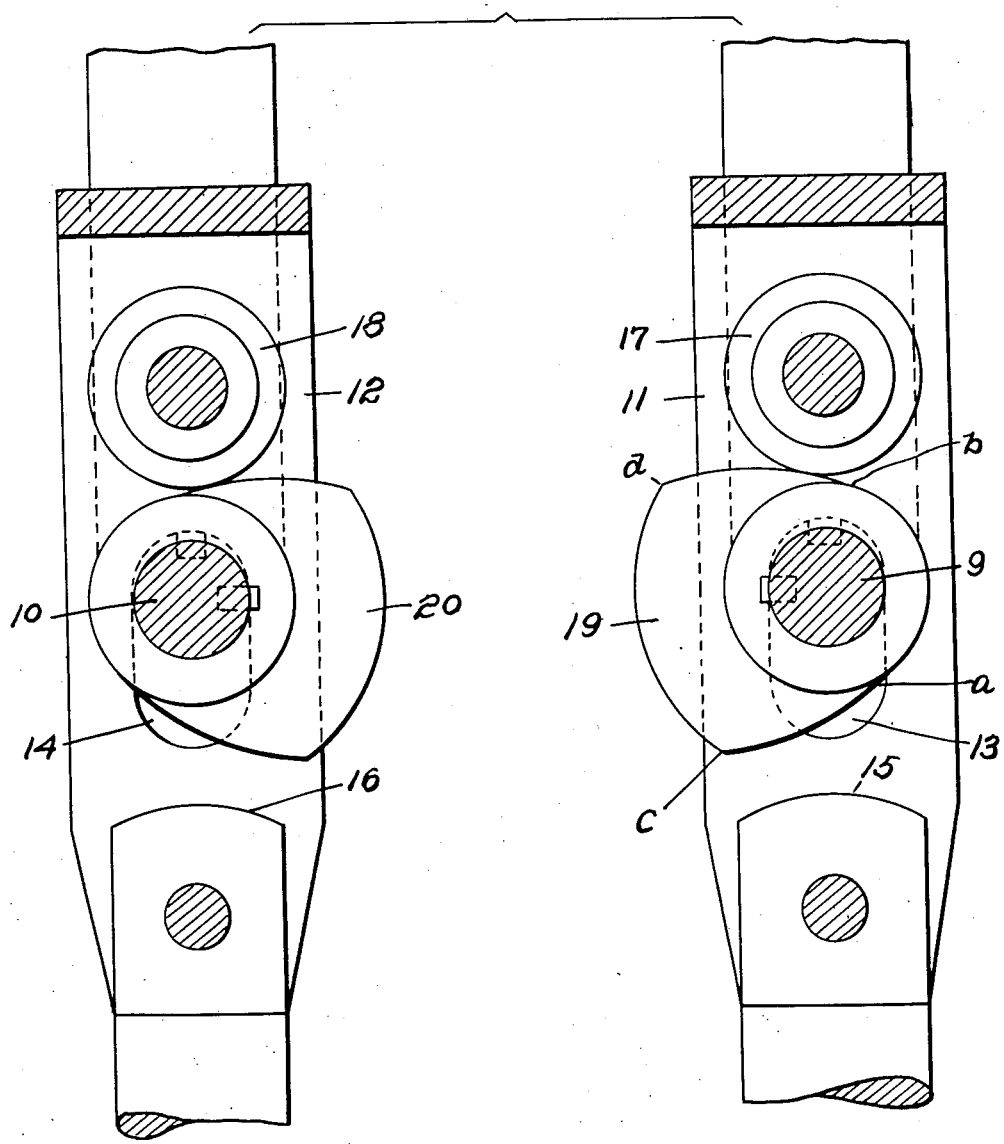

UNITED STATES PATENT OFFICE.

CHARLES A. BORCHERT AND MICHAEL G. O'NEIL, OF WOODLAWN, PENNSYLVANIA, ASSIGNORS TO PROTECTED SEAT VALVE COMPANY, OF PITTSBURGH, PENNSYLVANIA, A CORPORATION OF PENNSYLVANIA.

VALVE.

1,387,831.

Specification of Letters Patent.

Patented Aug. 16, 1921.

Application filed September 17, 1920. Serial No. 410,982.

*To all whom it may concern:*

Be it known that we, CHARLES A. BORCHERT and MICHAEL G. O'NEIL, both residing at Woodlawn, in the county of Beaver and State of Pennsylvania, both citizens of the United States, have invented or discovered certain new and useful Improvements in Valves, of which improvements the following is a specification.

Our invention relates to valves. While in certain features it is applicable to valves for fluid conduits generally, more particular features of our invention have to do with the control of water flow to and from hydraulic cylinders, and in that particular application we shall show and describe it.

In the accompanying drawings Figure I is a view partly in vertical section partly in elevation of the valve mechanism of a hydraulic cylinder embodying our invention; Fig. II shows in section and in another position the controlling mechanism for the valves, which in Fig. I is shown in elevation.

The valve casing is suitably connected, and the several connections are sufficiently indicated: 1 is the inlet passage for water under pressure; 2 is the passageway through which communication is established with the hydraulic cylinder, for alternate inflow of water under pressure and outflow of water relieved of pressure; and 3 is the waste passageway. In the operation there are three alternate positions of the valves: first, the neutral position, when both inlet to and outlet from the cylinder are closed; second, working position, when communication is open for water under head to the cylinder; and, third, relief position, when communication is cut between the source of pressure or head and the cylinder, and the cylinder itself is open to waste.

Within the casing are two valves 4 and 5, which normally seat themselves in the direction of flow; one of these, valve 4, controls communication from inlet 1 to cylinder passageway 2; the other when closed does not interfere with communication from inlet 1 to cylinder 2, but, being open, opens communication from cylinder passageway 2 to waste 3. The three positions alluded to above are (1) when both valves are closed (this is the neutral position), (2) when valve 5 is closed and valve 4 open (this is the working position), and (3) when valve 4 is closed and valve 5 is open (this is relief position).

The valves are conveniently arranged side by side, with seats in a common plane; they open in the same direction; and their stems 6 and 7 extend in parallelism, and as here shown these stems extend vertically upward. Carried conveniently on the valve casing (the essential feature is rigidity) is a base or bracket 8, in which are journaled two cam shafts 9 and 10. These cam shafts are arranged opposite the ends of valve stems 6 and 7, and with axes parallel one to another. The valve stems terminate in yokes 11 and 12 which span the bracket 8 and the cam shafts which it bears, and in the arms of each yoke are formed slots 13 and 14 through which the firmly anchored cam shafts protrude while the valve stems are free to rise and fall. Between the arms of each yoke at their outer ends, beyond the slots through which the cam shafts protrude, are journaled thrust rollers 17 and 18. The cams 19 and 20 which the cam shafts 9 and 10 bear turn within the yokes beneath the thrust rollers 17 and 18. The shape of the cams is shown in the drawing.

The cam shafts 9 and 10 are linked for simultaneous turning, so that the cams assume simultaneously any one of three positions: (1) that shown in Fig. II, when manifestly the valve stems are both relieved of cam thrust, and the valves are free to seat themselves (this is neutral position); (2) that shown in Fig. I, when cam 19, engaging thrust roller 17, raises valve 4 from its seat, while cam 20, turned away from thrust roller 18, leaves valve 5 free to seat itself (this is working position); or (3) a position not separately shown, but readily understood, in which the positions of cams 19 and 20 are reversed, and valve 5 is held open, while valve 4 is left free to seat itself (this is the relief position). A hand lever 21 serves to swing the cam shafts from one to another of the three alternate positions. And this remains to be said: the neutral position, illustrated in Fig. II, is intermediate between the other two. In order to pass from working position to relief position, or the reverse, it is necessary to pass through neutral position.

Coming now to the valves themselves, these features are to be noted: First, they are secured to their stems by the particular construction described and claimed in an application for United States Letters Patent filed April 21, 1920, by the present applicant, George P. Dempler, Serial No. 375,446. The characteristic features of this connection are that the end of the valve stem is enlarged and spherically faced, and the two-part valve, whose parts are separably united by screw-thread engagement, incloses in cage-like manner the enlarged head of the valve stem, and yet there is sufficient play of valve upon stem to compensate for small inaccuracies of alinement. Removal and replacement is easily accomplished. A second feature which characterizes these valves is that they embody also the invention of the present applicants Charles A. Borchert and Michael G. O'Neil, described in the specification of Letters Patent of the United States No. 1,267,365, granted May 28, 1918. The feature here alluded to is that the valve seat 26 is contained within and below the rim of the tubular member 23 in which it is formed, while the valve member 4 is provided with a depending flange 22 which telescopes externally upon the tubular member referred to and extends beyond the bearing surface 25 of the valve. By these provisions the valve faces are protected against cutting by grit borne in the flowing stream of water, and furthermore the valve faces are always swept clean of grit.

Third. There are other features of valve structure, which are not disclosed in either of the specifications alluded to. One is that the valves are cushioned, and cushioned at both extremities of their ranges of movement. The cushioning effect on closing is attained by providing the valve member 4 not only with the depending flange 22 already alluded to, telescoping externally upon the tubular member 23 in which the valve seat 26 is formed, but provided also with an extension 24, at the inner side of the bearing surface 25 of the valve, which extension 24 telescopes on the interior surface of the tubular member 23 and at the inner side of valve seat 26. Thus an annular pocket is formed in the valve body, into which as the valve descends to closed position the tubular member 23 extends and this pocket manifestly constitutes a cushioning device. In consequence of the adoption of the valve structure as now described, the whole valve may be formed of metal, such metal for example as bronze, and there is no need for any facing of fiber or rubber or any other applied material. This is a feature of particular value when water under great pressure and bearing mud, sand scale or other solid particles is to be dealt with. Bearing faces of soft material cannot endure practical conditions of high pressure.

The cushioning of the valve at the opposite limit of its stroke, as it comes to wide open position, is effected by forming valve and casing with coöperating shoulder 27 and recess 28, which, after the manner of a dash-pot, cushion the movement of the valve at the end of the opening stroke.

Fourth. A still further feature of valve construction concerns particularly the inlet valve 4. It is so far balanced that, under the pressure conditions for which it has been designed and intended, it will, the bodies of water above and below it being subjected alike to the head, be readily responsive to the opening means described, and yet when relieved of the restraints of the opening means, will move immediately and rapidly to its seat. The balancing feature is found in the extension 29 of the valve stem beyond the valve on the side opposite to stem 6. This extension crosses the water passageway and enters an opening in the opposite casing wall, and is properly packed in its engagement with that opening. The dimensions of this stem are carefully worked out, and it is so proportioned as to afford the result defined above.

It will be understood of the waste valve 5 that it requires no such balancing, for in its functioning it is subject to no back pressure on its delivery side.

With particular attention directed to the shape of the cams 19 and 20, it will be seen that each has opposite concentric areas $a$—$b$ and $c$—$d$, of which $a$—$b$ is of small radius and $c$—$d$ of large radius, and intermediate, approximately spiral areas—areas inclined to radii,—$a$—$c$ and $b$—$d$. Considering the action of one of these cams alone—and what is true of one is true of the other,—let attention be centered on cam 19. As shown in Fig. II the cam is in neutral position, and about to pass from neutral to active position. The cam is exerting no lifting force upon the now closed valve. As the cam is turned clockwise, the inclined or spiral surface $b$—$d$ bears upon thrust roller 17 and causes it to roll along that surface, from $b$ to $d$, and in so doing to rise. Fig. I shows this rising movement at its height, and, manifestly, further turning of cam 19 clockwise, beyond the position shown in Fig. I will merely bring roller 17 to bear on the concentric area $c$—$d$ of the cam, which it will traverse as the cam turns, without any further rise. The effect of this is that the valve may, by a partial swinging of hand lever 21 be opened and held open; but will, on letting go of the hand lever, immediately close again; while, by a full swinging of hand lever 21, the valve may be opened and will remain open without the need of keeping a hand on lever 21. When the high portion $c$—$d$ of the cam is engaging the thrust roller and holding the valve open, and closure of the valve is desired, a light push only is necessary, carrying the high portion of the cam beyond engagement with the thrust roller. The valve-operating device will then automatically return to neutral. The lever is freely and easily operable in any position.

Operation will readily be understood. With cams in the position shown in Fig. II, both valves are closed. This is the neutral position. It may then be either that the hydraulic cylinder is full of water and sustaining a load, or empty and inactive. Suppose the latter be the case, and suppose the cylinder be in position, ready to act and raise a load. Hand lever 21 is then swung clockwise. Both shafts 9 and 10 turn clockwise in response. Cam 20 is turned away from thrust roller 18, and accordingly valve 5 remains closed; but cam 19 engages thrust roller 17 after the manner just described, and valve 4 is opened. The opening may, by a short swing of lever 21, be sustained by muscular force, or, by a longer swing, be secure mechanically against closing again. The opening of valve 4 admits water under head through passageways 1 and 2 to the cylinder, and raises the cylinder piston under the hydraulic power available. When the piston has so made its stroke, and is sustaining its load, the valve 4 may remain open; or again, lever 21 being swung anti-clockwise until the cams come again to neutral position, valve 4 may close. Then both valves are closed, and the piston of the hydraulic cylinder stands in extended position. When thereafter it is desired to have the piston of the hydraulic cylinder descend again, the lever 21 is swung still farther anti-clockwise, and in like manner as cam 19 in the foregoing description engaged thrust roller 17, so now cam 20 engages thrust roller 18, while cam 19, swinging away from its thrust roller, continues inactive. The effect is that, while valve 4 remains closed, and the cylinder accordingly cut off from the head of the water supply, valve 5 is opened and communication established from the cylinder to the waste. Through waste passage 3 the cylinder vents itself, and the piston makes its descending stroke. Return of the cams to neutral position, by the swinging of lever 21 clockwise, allows valve 5 to close again while valve 4 still continues closed, and then further swinging of the lever 21 clockwise opens valve 4, in the manner and for the ends described.

The essential features of our present invention are defined in the ensuing claims. If these features be employed our invention will be enjoyed, whatever be the variations in structural details.

We claim as our invention:

1. The combination with a valve casing provided with an inlet and an outlet and with a port affording communication therebetween, of means for controlling flow through said port, said means comprising a sleeve member provided with a valve seat and a closure member provided with a corresponding valve surface, said closure member being further provided with a flange adapted when the parts are assembled and the valve is approaching closed position to engage the exterior surface of said sleeve in continuous contact around the whole extent thereof and as to move telescopically thereon, and with a second extension adapted when the valve is approaching closed position to engage in continuous circumferential contact the interior surface of said sleeve and to move telescopically thereon, and means for moving one of said members relatively to the other, substantially as described.

2. The combination of a valve casing provided with an inlet and an outlet and with a port affording communication therebetween, a sleeve member arranged in said port and provided with a valve seat, a valve member provided with an annular pocket, the opposite walls of said pocket being adapted when the parts are assembled and operated to engage and telescope upon the opposite surfaces of said sleeve member and the bottom of said pocket constituting the seat-engaging surface, the said casing being provided with a dashpot recess opposite said valve member, and means for moving said valve member, substantially as described.

3. The combination of a valve casing provided with inlet and outlet and with a port affording communication therebetween, a valve movable within said casing to open and close said port, and means for cushioning said valve at both limits of its range, when opening and closing, substantially as described.

4. In a fluid control valve the combination of a valve casing provided with inlet and outlet and with a port affording communication therebetween, a valve movable within said casing to positions of opening and closure with respect to said port, means for cushioning said valve in its movement as it approaches the limits of its range, both in opening and in closing, an operating stem extending from said valve on one side and a balancing stem extending from said valve upon the opposite side and into the opposite casing wall, substantially as described.

In testimony whereof we have hereunto set our hands.

CHARLES A. BORCHERT.
MICHAEL G. O'NEIL.

Witnesses:
BAYARD H. CHRISTY,
FRANCIS J. TOMASSON.